Figures 1, 2, 3, 4:
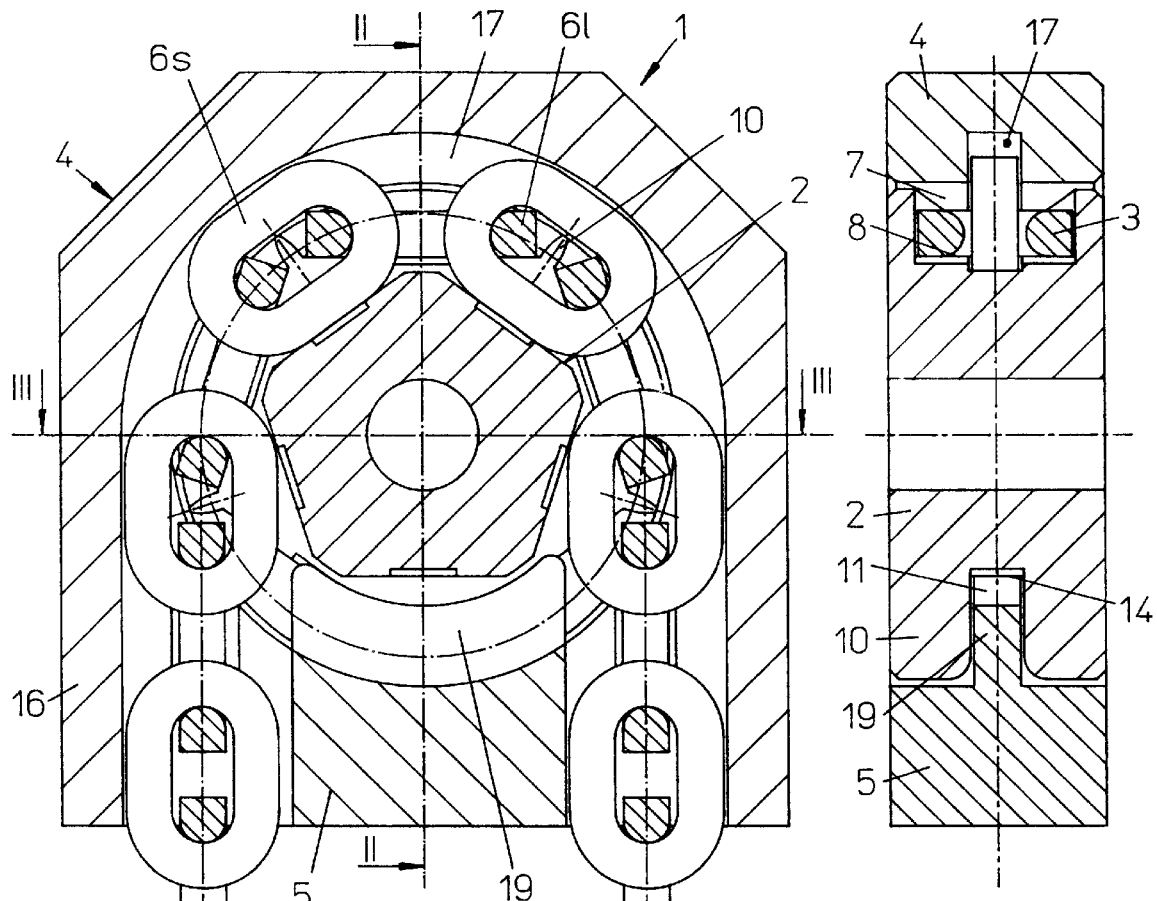

United States Patent

Walenta et al.

[11] Patent Number: 5,803,851
[45] Date of Patent: Sep. 8, 1998

[54] CHAIN DRIVE WITH SECTIONAL STEEL CHAIN

[75] Inventors: Gerard Walenta, Graz; Franz Fuchs, Kapfenberg, both of Austria

[73] Assignee: Pewag Austria GmbH, Graz, Austria

[21] Appl. No.: 882,842

[22] Filed: Jun. 26, 1997

[30] Foreign Application Priority Data

Jul. 3, 1996 [AT] Austria ..................... 1179/96

[51] Int. Cl.⁶ ............................. F16H 7/06; F16G 13/02
[52] U.S. Cl. ............................. 474/155; 474/206
[58] Field of Search ..................... 474/148, 149, 474/151, 152, 153, 155, 202, 206, 226, 144; 59/78, 84

[56] References Cited

U.S. PATENT DOCUMENTS

| | | | |
|---|---|---|---|
| 2,525,193 | 10/1950 | Anderson et al. | 59/84 |
| 3,662,539 | 5/1972 | Florjancic | 59/84 X |
| 4,343,614 | 8/1982 | Schulte | 474/206 X |
| 4,473,364 | 9/1984 | Roling | 474/155 X |
| 4,498,284 | 2/1985 | Gearhart | 59/84 |
| 4,501,577 | 2/1985 | Roling et al. | 474/155 |
| 4,792,323 | 12/1988 | Flaig | 474/144 |
| 4,804,353 | 2/1989 | Wenman | 474/155 X |

FOREIGN PATENT DOCUMENTS

| | | |
|---|---|---|
| 0 269 557 A1 | 6/1988 | European Pat. Off. . |
| 0 530 935 A1 | 3/1993 | European Pat. Off. . |
| 1041883 | 8/1951 | France .................. 59/78 |
| 3929148A 1 | 1/1991 | Germany . |

*Primary Examiner*—Thomas R. Hannon
*Attorney, Agent, or Firm*—The Chupa Law Firm, P.C.

[57] ABSTRACT

A chain drive (1), in particular for lifting devices, having a chain (3) which rotates about a chain wheel (2) and whose oval links (6) which are rotated in an alternate manner about 90° interact as vertical and horizontal links with the chain wheel, wherein the horizontal links (6*i*) are received in pockets (7) of the chain wheel with substantially planar support surfaces (6) and can be supported with their curved ends (6') on teeth (10) which comprise convex flanks (12) and the vertical links (6*s*) are positioned in a groove (11) between the teeth, wherein the wire cross-section of the chain links (6) is a rectangle having a curvature adjoined thereto towards the inner part of the link and the convex flanks (12) and the planar support surfaces (8) contact each other in a substantially direct manner, i.e along a transition edge (13), so that the entire surfaces of the horizontal links (6*l*) and the vertical links (6*s*) can be supported substantially on the support surfaces (8 and 14) of the chain pockets (7) and/or of the groove (11), wherein each horizontal link (6*l*) can reach with the edge of a curved end (6') as far as the transition edge (13).

15 Claims, 2 Drawing Sheets

CHAIN DRIVE WITH SECTIONAL STEEL CHAIN

The invention relates to a chain wheel, a chain and a chain drive.

For chain drives, e.g. in the case of electrically or pneumatically operated lifting devices or in the case of conveyors, round steel chains are used together with pocket wheels. A pocket wheel which is suitable for this purpose is disclosed in GB 1 198 473 A. As is evident in FIG. 1 of this document, both the vertical and horizontal links lie on the chain wheel only in a few regions, namely the horizontal links only with their curved ends on the tooth flanks and the vertical links in the transition region between their curved ends and limbs on the base of a groove, thus producing a predominantly linear contact which is associated with a high specific support pressing.

Such a high support pressing also occurs when the base of the pockets is formed in a planar manner, since the round steel links lie at this site only in a linear manner, so that during operation wear causes the formation of troughs.

EP 269 557 A illustrates a chain wheel for round steel chains, wherein, as in the case of the aforementioned document, a support for the horizontal links on the pocket base is omitted and attention is directed in particular to a concave rounding-off in the transition region of the tooth flanks and the pocket base, in order to obtain at least one small, planar support region.

DE 39 29 148 A1 illustrates a profile chain, in which it is required that the curvature of the cross-section under compression is tailored to suit completely the inner chain link curvature. However, it is evident in practice that in this manner even in the case of a small load the chain link becomes jammed causing a high degree of wear.

In the case of the chain wheel for a round steel chain illustrated in EP 530 935 A1 it is assumed that the support surfaces of the chain wheel consist of relatively soft material, so that the chain links can be almost "embedded" into the support surfaces. It goes without saying that soft surfaces of this type ultimately result in the chain wheel wearing out rapidly.

U.S. Pat. No. 4 792 323 discloses a housing for a chain drive which is produced from sheet metal for the purpose of reducing costs, wherein however no attention is paid to guiding the chain in a reliable and namely planar manner.

The common aspect of all known solutions is that the chain links are stressed to an undesirably high degree which can lead to high level of wear and/or fracture. This can now be counteracted by virtue of correspondingly generous dimensioning and by selecting expensive materials.

It is an object of the invention to create a chain wheel, a chain and a chain drive, wherein the above stated disadvantages can be counteracted.

This object is achieved with a chain wheel of the type stated in the introduction wherein in accordance with the invention the convex flanks and the planar support surfaces contact each other in a substantially direct manner, i.e. along a transition edge.

For a chain wheel of this type the invention also provides the use of a chain having oval links which in use are rotated with respect to each other in an alternate manner about 90°, wherein in accordance with the invention the wire cross-section of the chain links is a rectangle comprising a curvature which is adjoined thereto towards the inner part of the link.

Accordingly, the object of the invention is also achieved by means of a chain drive of the type stated in the introduction, wherein in accordance with the invention the wire cross-section of the chain links is a rectangle comprising a curvature which is adjoined thereto towards the inner part of the link and the convex flanks and the planar support surfaces contact each other in a substantially direct manner, i.e. along a transition edge, so that the entire surface of the horizontal links can be supported in a substantial manner on the support surfaces of the chain pockets, wherein each horizontal link can reach with the edge of a curved end as far as the transition edge.

Thus, the invention shifts intentionally from conventional round steel chains to so-called sectional steel chains, which as such are known for being used as pull chains, e.g. in forestry or also in the case of snow chains.

By virtue of the invention it is possible to support the horizontal chain links on the pocket base in a planar manner over wide regions which results in lower surface pressure. The vertical link can now also be supported in a planar manner without having to machine the groove base using costly a profile milling procedure—which would be required for the purpose of providing a planar support in the case of round steel chains. When using a chain guide this is subjected to lower forces, since both the vertical and the horizontal links are already held in the chain wheel in an improved manner. It is less costly to produce the chain wheel than to produce known chain wheels comprising a rounded transition region between the tooth flanks and the pocket bases, since the pocket base can also be produced for example with the aid of a simple end milling cutter.

Further features of the invention are described in the subordinate claims.

Figure 5:
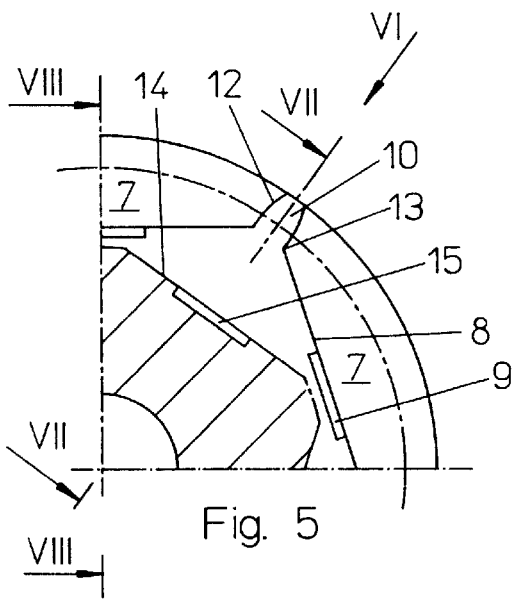
Figure 6:
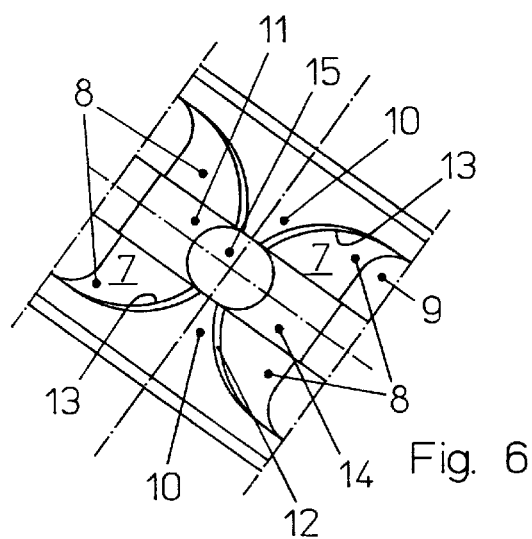
Figure 7:
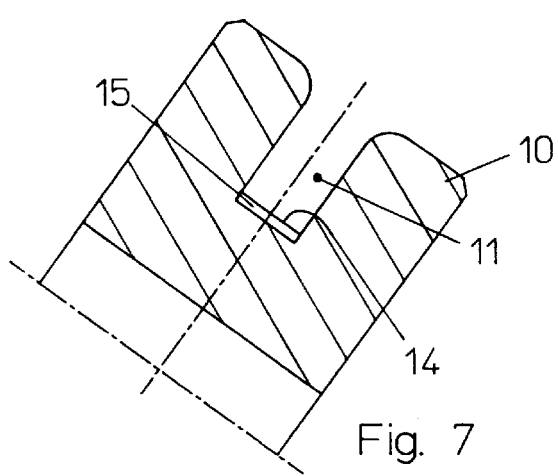
Figure 8:
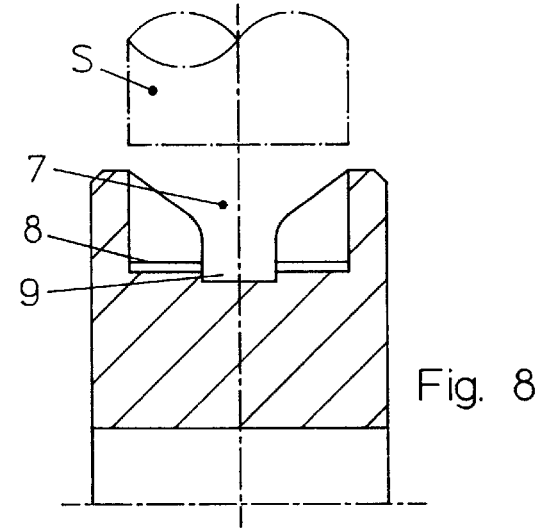
Figure 9:
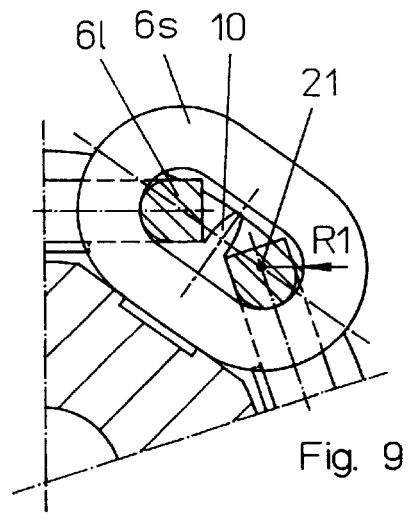
Figure 10:
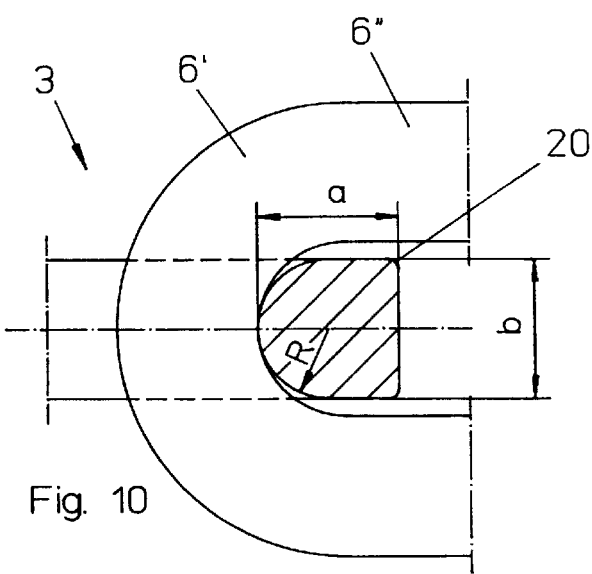

The invention and other advantages are explained in detail hereinunder with reference to exemplified embodiments illustrated in the drawing, in which FIG. 1 shows a vertical sectional view through a chain drive according to the invention in the middle plane of the chain wheel along the line I—I of FIG. 3, FIG. 2 shows a sectional view along the line II—II of FIG. 1, FIG. 3 shows a sectional view along the line III—III of FIG. 1 without the chain, FIG. 4 shows a sectional steel chain, in a partial sectional view, FIG. 5 shows a 90° sector of the chain wheel of FIG. 1 in the same view as FIG. 1, FIG. 6 shows a view in the direction of the arrow VI of FIG. 5, FIG. 7 shows a sectional view along the line VII—VII of FIG. 5 and FIG. 8 shows a sectional view along the line VIII—VIII of FIG. 5, FIG. 9 shows a somewhat enlarged detail of FIG. 1, and FIG. 10 shows an further enlarged detail of FIG. 4.

The chain drive 1 illustrated in FIGS. 1 to 3 is intended for a lifting device and comprises a chain wheel 2, a chain 3, a chain guide 4 and a stripper 5, wherein details of the chain wheel 2 are also illustrated in FIG. 2 and FIGS. 5 to 9.

Firstly the chain 3 used in accordance with the invention, a so-called sectional steel chain, is explained in detail with reference to FIG. 4. The links 6 of the chain 3 are oval in the same manner as the links of a conventional round steel chain and are rotated in use in an alternate manner about 90°. In FIG. 1 the links which are vertical in the chain wheel 2 are designated by 6s and the horizontal links by 6l accordingly.

The wire cross-section of the chain links 6 is a rectangle to which is adjoined a curvature, e.g. in the form of a segment of a circle, which points towards the inner part of the link, wherein the curvature is preferably a semi-circle. Each chain link 6 comprises two semi-circular curved ends 6', to which straight limbs 6" are connected. The chain pitch is preferably three times that of the wire strength or thickness and the chain itself is produced preferably from case hardened or heat-treated steel.

Two adjacent links 6 which are rotated with respect to each other about 90° contact each other with the inner curvatures of their curved ends, wherein in theory only a linear or even only parallel contact is produced. In order to obviate the resulting high support pressing the curvature is tailored in a certain manner to suit the radius of curvature in the curved end of the links, wherein consideration is given to the fact that when the chain is subjected to a load the radius of curvature of the inner chain curvature changes namely in the sense of a reduction and that in the case of a load the curvature should not comprise a larger radius than the radius of curvature of the inner chain curvature. In particular, the radius R of the curvature is smaller than the radius R1 of the curved end 6' of the links 6 (see FIGS. 9 and 10) when the chain is in both the loaded or unloaded state. The term "curvature" of wire cross-section is also intended to mean a polygonal shape which however is constantly rounded-off and can provide support at many regions of the inner side of the curved end.

It is also evident in FIG. 10, that in the case of a preferred embodiment the radius R of the curvature is substantially equal to half the rectangular side 6, thus b/2=R, so that a=b when a is the dimension of the link profile between the rectangular base and the apex of the segment of the circle.

The chain wheel 2 according to the invention is a so-called pocket chain wheel. Accordingly, it comprises pockets 7, which are tailored to suit the oval link shape and which comprise a substantially planar support surface 8 (pocket base). Recesses 9 can be formed in the longitudinal middle of the pockets 7 and where appropriate serve to receive a welded bead [not illustrated] about a limb 6" of the chain link 6, so that the link 6 can lie in a planar manner on the support surface 8 even when a welded bead of this type is provided.

The pockets 7 of the chain wheel 2 are defined on both sides by teeth 10, wherein each tooth 10 is separated by virtue of a groove 11 for the purpose of receiving the vertical links 6s in the middle plane of the chain wheel 2, so that double teeth are provided. In the present exemplified embodiment a pentagonal chain wheel 2 is illustrated comprising five such teeth 10 or double teeth and accordingly comprising five pockets, yet it is clear that the chain wheel can comprise in a known manner a higher or lower number of teeth 10.

The convex flanks 12 of the teeth 10 (FIG. 5, 6) change directly into the planar support surfaces 8 without a rounded, e.g. concave transition region, so that a pronounced transition edge 13 is produced, whose shape is clearly illustrated in FIG. 6. In the preferably planar base 14 of the grooves 11 for the vertical links a depression 15 is created between the teeth 10 in this exemplified embodiment and serves the same purpose as the recess 9, namely to receive where appropriate a welded bead (not illustrated) of the vertical link 6s so that said link can lie or be supported in a planar manner on the groove base 14 with the planar outer side of its inner limb. It is extremely important to the function of the chain drive and/or wheel that the vertical links 6s are supported on the groove base 14, since the horizontal links are supported for their part on the vertical links during the pivoting procedure. Otherwise the edges of the horizontal links would "cut in" into the support surfaces 8 upon pivoting into the chain wheel.

As evident in FIG. 1 both the horizontal links 6l and the vertical links 6s are supported in a planar manner by virtue of the invention, namely the horizontal links 6l with a large part of their lateral surfaces on the support surface 8 of the pockets 7 and the vertical links 6s with the outer surface of the inwardly lying limb on the groove base 14.

In the case of the chain drive 1 illustrated in FIGS. 1 to 3 the chain guide 4 surrounds the chain wheel 2 at a looping angle of 180°, in order subsequently to continue in a tangential manner in parallel end pieces 16. In this type of guide 4 a guide channel 17 is formed having a rectangular cross-section which is tailored to suit the link profile, in which channel the vertical links 6s during rotation are supported by means of their outer limbs and a part of their curved ends.

The stripper 5 which is also evident in FIGS. 1 to 3 comprises a guide channel 18 both for the vertical and the horizontal links of the chain 3, wherein this guide channel is tailored in cross-section to suit the link profile so that the chain links are supported in a planar manner both on the stripper 5 and on the chain guide 4, wherein it is to be noted that the chain guide is not loaded to a significant extent owing to the fact that the chain links 6 are already supported in an extremely reliable manner in the chain wheel 2.

The stripper 5 comprises in a known manner a stripping nose 19 which extends as far as and into the groove 11 of the chain wheel 2 and which covers substantially each region of the chain wheel which is free from the chain 3.

In FIG. 1 the load side is designated by the arrow L. In the case of a load the horizontal links 6l lie with the edges of their curved ends—on the left hand side in FIG. 1—on the transition edges 13 between the tooth flanks 12 and the support surface 8, whereas the respective other curved ends—on the right hand side in the drawing—lie with their edges at a small spaced interval from the transition edges 13.

The invention also ensures that in the case of equal outer dimensions of the chain and the chain drive the specific supporting tension of the chain is reduced, which results in a correspondingly high level of safety. Accordingly it is also possible, even when maintaining the same level of safety, to reduce the dimensions and the materials requirement.

The chain wheel 2, like the guide 4 and the stripper 5, can consist of e.g. heat-treated steel, yet here the use of correspondingly strong and/or reinforced synthetic materials can be suitable where appropriate. In order to machine a chain wheel according to the invention using steel, in particular for the production of the planar pocket bases, commercial end milling cutters S (illustrated in FIG. 8) can be used; it is not necessary to employ costly milling procedures using profiling cutters as in the case of the cross-section of pocket bases, tailored to suit round steel links, of known chain wheels.

We claim:

1. Chain wheel (2) for a chain, which consists of oval, vertical and horizontal links which are rotated in an alternate manner about 90°, having pockets (7), which comprise substantially planar support surfaces (8), for the purpose of receiving the horizontal links (6l), and having teeth (10) for the purpose of supporting the horizontal links with their curved ends (6'), wherein the teeth comprise convex flanks (12) and the vertical links (6s) are received in a groove (11) between the teeth, characterized in that the convex flanks (12) and the planar support surface (8) contact each other in a substantially direct manner, along a transition edge (13).

2. Chain wheel (2) according to claim 1, characterised in that the base (14) of the groove (11) is substantially planar.

3. Chain (3) for chain drives consisting of oval links which in use are rotated with respect to each other in an alternate manner about 90° for use with a pocket chain wheel, wherein the wire cross-section of the chain links (6) is a rectangle comprising a curvature adjoined thereto towards the inner part of the link, characterised in that the radius (R) of the curvature is smaller than the radius (R1) of the curved end (6') of the links (6) both in the unloaded and loaded state.

4. Chain (3) for chain drives according to claim 3, characterised in that the radius (R) of the curvature is substantially equal to half the longitudinal side (b) of the rectangle.

5. Chain (3) for chain drives according to claim 3 or 4, characterised in that the curvature is a segment of a circle.

6. Chain (3) for chain drives according to claim 5, characterized in that straight limbs (6") adjoin the curved ends (6') of the chain links.

7. Chain (3) for chain drives according to claim 6, characterized in that the ratio of pitch to wire strength is approximately 3:1.

8. Chain (3) for chain drives according to claim 3, characterized in that straight limbs (6") adjoin the curved ends (6') of the chain links.

9. Chain (3) for chain drives according to claim 3, characterized in that the ratio of pitch to wire strength is approximately 3:1.

10. Chain drive (1), comprising a chain (3) which rotates about a chain wheel (2) and whose oval links (6) which are rotated in an alternate manner about 90° interact as vertical and horizontal links with the chain wheel, wherein the horizontal links (6*l*) are received in pockets (7) of the chain of the wheel with substantially planar support surfaces (6) and can be supported with their curved ends (6') on teeth (10) comprising convex flanks (12) and the vertical links (6*s*) are positioned in a groove (11) between the teeth, characterised in that the wire cross-section of the links (6) is a rectangle having a curvature adjoined thereto towards the inner part of the link and the convex flanks (12) and the planar support surfaces (8) contact each other in a substantially direct manner, along a transition edge (13), so that the horizontal links (6*l*) and the vertical links (6*s*) can be respectively supported in a substantial manner on the support surface (8) of the chain pockets (7) and on surface 14 of the grove (11), wherein each horizontal link (6*l*) can reach with the edge of a curved end (6') as far as the transition edge (13).

11. Chain drive (1) according to claim 10, characterised in that the radius (R) of the curvature is smaller than the radius (R1) of the curved end (6') of the links (6) both in the unloaded and loaded state.

12. Chain drive (1) according to claim 10 or 11, characterised in that the radius (R) of the curvature is substantially equal to half the longitudinal side (b) of the rectangle.

13. Chain drive (1) according to claim 12, characterised in that the chain wheel (2) is allocated a guide (4) which surrounds said chain wheel at least at a predetermined looping angle and in which a guide channel (17) is formed for the purpose of supporting the outer regions of the vertical links (6*s*), which guide channel comprises a rectangular cross-section.

14. Chain drive according to claim 13, characterised in that the guide (4) and the guide channel (18) continue in tangential end pieces (16) after the looping angle.

15. Chain drive (1) according to claim 14, characterised in that between the end pieces (16) there is provided a stripper (5) which comprises guide channel (18), which is tailored in cross-section to suit the link profile, both for the inner limb of the vertical links and for the horizontal links.

* * * * *